Dec. 1, 1959 H. ARNOLD ET AL 2,915,348
PISTON PACKING
Filed May 6, 1957
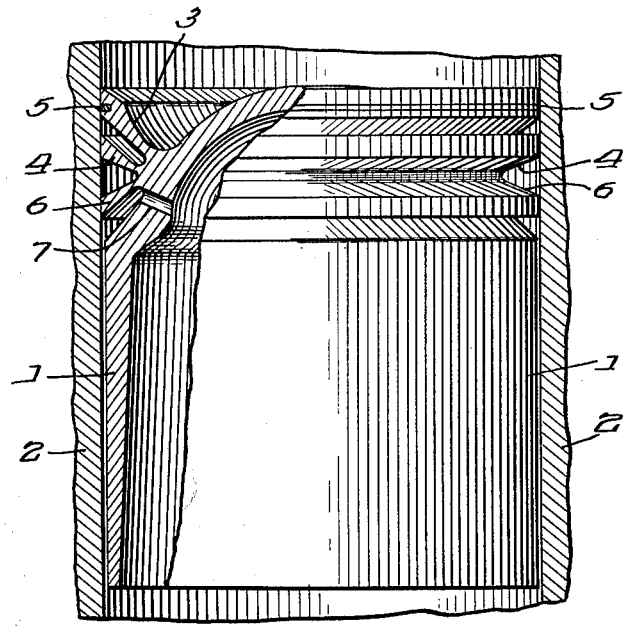
Inventors.
Hartmut Arnold, &
Gerhard Dück.
By Atty

United States Patent Office 2,915,348
Patented Dec. 1, 1959

2,915,348

PISTON PACKING

Hartmut Arnold, Burscheid-Fullsichel, and Gerhard Dück, Burscheid, Germany, assignors to Goetzwerke Friedrich Goetze Aktiengesellschaft, Burscheid, near Koln, Germany, a corporation of Germany Application May 6, 1957, Serial No. 657,078

Claims priority, application Germany May 7, 1956

4 Claims. (Cl. 309—10)

This invention is concerned with a piston comprising packing or sealing means including at least one resilient web which is integral with the piston wall.

It is known to provide in pistons of internal combustion engines labyrinth-like grooves serving for the sealing thereof. It has been found, however, that such labyrinth-like grooves do not provide for sufficient confinement of the combustion gases which are under pressure. It is also known to provide a piston with webs which extend at an incline to the crankcase. The webs of the prior structures are in sealing engagement with the cylinder wall wiping the oil therefrom sufficiently, but are not adapted to seal satisfactorily against the explosion gases; accordingly, piston rings had to be provided for the upper portions of the pistons. In addition, the provision of the relatively many grooves proved to be uneconomical.

It is further known to cast into pistons coiled rings made of striplike material. However, the axial leg of such a coiled ring cannot move radially and therefore cannot satisfactorily fit to irregularities of the cylinder wall. The packing or sealing medium furthermore cannot reach in back of the axial web for pressing it more strongly against the cylinder wall. Pistons constructed in this manner have not been successful in practical operation due to the insufficient adaptability and resilience of the packing means.

The invention proposes the provision of piston webs directed toward the space that is to be sealed and, if desired, slotted to provide for elastic adaptability with respect to the shape of the cylinder wall.

It has been found advantageous to dispose the web formed from the piston wall at an incline to the piston axis with its free end in sealing engagement with the piston wall. However, web structures which are radially thinner and axially longer and, if desired, conical with respect to the contacting surface, have also proved satisfactory as packing or sealing members. In the case of such webs, there is often provided a hollow space between the piston wall and part of the web, such space being open with respect to the combustion chamber. The medium to be sealed is in such arrangement jointly used for the sealing as it exerts pressure on the webs to secure engagement thereof with the cylinder wall.

Upon using the piston packing according to the invention, for relatively low pressure sealing, it is advantageous to fit the webs into the cylinder with a slight excess dimension so that they adapt themselves to the cylinder wall with a corresponding pre-tension.

The resiliency or elasticity of the webs is further improved by making them in cross-sectionally tapered form. A relatively large sliding surface in engagement with the cylinder wall is thus provided while the transition from the webs to the piston is very elastic due to the small cross-section.

It is moreover possible to provide a plurality of webs disposed at different angles with respect to the space to be sealed, thus increasing the sealing action. It is in such construction possible to use the first web facing the space to be sealed for sealing against the explosion gases, and the next web for guiding the piston so as to avoid undesired piston tipping. It is in some cases advantageous to provide within the sliding surface of a web at least one auxiliary packing ring which may have a radial tension.

Upon using for pistons of internal combustion engines the sealing means according to the invention, it will be of advantage to provide at least one web inclined respectively to the combustion chamber and to the crankcase. The web directed toward the crankcase will wipe the oil from the cylinder wall and guide it back to the crankcase, if desired, by way of suitably disposed oil flow bores or slots. The oil wiping web may engage the cylinder wall with pressure while the web or webs directed to the combustion chamber need not be pre-tensioned as they are brought into proper engagement with the cylinder wall by the pressure of the combustion gases.

The various features of the invention will appear from the description which is rendered below with reference to the single figure of the accompanying drawing, showing an embodiment in diagrammatic part sectional representation.

In the drawing, the piston 1, within the cylinder 2, is sealed with respect to the combustion gases by webs 3 and 4. The web 3 comprises an axially thin auxiliary packing ring 5 which engages the wall of the cylinder 2 with inherent tension. A web 6 is provided for wiping the oil from the cylinder wall, the oil being guided back to the crankcase by way of bore 7.

Changes may be made within the scope and spirit of the appended claims.

We claim:

1. A piston comprising resilient web means integral with the piston and generally radially extending therefrom, said web means having a slot formed therein, one side of said web means facing the combustion space and the peripheral portion thereof being in resilient engagement with the inside wall of the cylinder to provide a sealing relation therewith.

2. A piston comprising resilient web means integral with the piston and generally radially extending therefrom at an incline to the piston axis, one side of said web means facing the combustion space and the peripherally extending end of said web means being in sealing engagement with the inside wall of the cylinder to provide a sealing relation therewith, and at least one further web means extending at an incline at different angle in the direction of the combustion space.

3. A piston comprising resilient web means integral with the piston and generally radially extending therefrom, one side of said web means facing the combustion space and the peripheral portion thereof being in resilient engagement with the inside wall of the cylinder to provide a sealing relation therewith, and at least one further sealing web facing in the general direction of the crank case.

4. A piston comprising resilient web means integral with the piston and generally radially extending therefrom, one side of said web means facing the combustion space and the peripheral portion thereof being in resilient engagement with the inside wall of the cylinder to provide a sealing relation therewith, at least one further sealing web facing in the general direction of the crank case, a bore being formed in the wall of said piston in back of said further sealing web.

References Cited in the file of this patent

UNITED STATES PATENTS

| | | |
|---|---|---|
| 949,993 | Blanchard | Feb. 22, 1910 |
| 1,020,836 | Moore | Mar. 19, 1912 |
| 1,115,176 | Daniel | Oct. 27, 1914 |
| 1,180,947 | Scott | Apr. 25, 1916 |
| 1,480,481 | Wakefield | Jan. 8, 1924 |
| 2,240,640 | Ducate | May 6, 1941 |
| 2,464,710 | Peterson | May 15, 1949 |